United States Patent [19]

Hori et al.

[11] Patent Number: 4,644,124
[45] Date of Patent: Feb. 17, 1987

[54] WIRE ELECTRODE TYPE ELECTRICAL DISCHARGE MACHINING METHOD

[75] Inventors: Toshimitsu Hori; Mitsutaka Sumita, both of Aichi, Japan

[73] Assignee: Mitsubishi Denki Kabushiki Kaisha, Tokyo, Japan

[21] Appl. No.: 691,592

[22] Filed: Jan. 15, 1985

[30] Foreign Application Priority Data

Jan. 17, 1984 [JP] Japan ........................... 59-4880

[51] Int. Cl.⁴ .................. B23H 7/06; G06F 15/46
[52] U.S. Cl. .................. 219/69 M; 219/69 W; 318/600; 364/475
[58] Field of Search .......... 219/69 W, 69 M, 69 C; 364/474, 475; 318/600

[56] References Cited

U.S. PATENT DOCUMENTS

| | | | |
|---|---|---|---|
| 3,943,322 | 3/1976 | Lehmann et al. | 219/69 E |
| 4,355,223 | 10/1982 | Inoue et al. | 219/69 W |
| 4,363,948 | 11/1982 | Itoh | 219/69 W |
| 4,465,914 | 8/1984 | Obara | 219/69 W |
| 4,467,166 | 8/1984 | Gamo et al. | 219/69 W |
| 4,559,601 | 12/1985 | Kishi et al. | 364/475 |

FOREIGN PATENT DOCUMENTS

| | | | |
|---|---|---|---|
| 2826489 | 3/1979 | Fed. Rep. of Germany | 219/69 W |
| 120390 | 9/1980 | Japan | 219/69 W |
| 56-39825 | 4/1981 | Japan | 219/69 W |
| 56-39833 | 4/1981 | Japan | 219/69 W |
| 102433 | 8/1981 | Japan | 219/69 W |
| 82/01148 | 4/1982 | PCT Int'l Appl. | 219/69 W |

OTHER PUBLICATIONS

Konisch-Schneiden Auf Draht-Erodieranlagen, D. Schumacher, pp. 44-46, Jan. 1980 (Metallbearbeitung).

Primary Examiner—A. D. Pellinen
Assistant Examiner—Geoffrey S. Evans
Attorney, Agent, or Firm—Sughrue, Mion, Zinn, Macpeak & Seas

[57] ABSTRACT

A wire electrode type electrical discharge machining method in which a wire electrode is controlled by an NC device to automatically move along predetermined loci while forming an angle with respect to a workpiece which is being machined, wherein, even when a taper offset value occurring prior to an intersection of program loci is different from that after the intersection, the program can be readily executed. Wire electrode movement instruction codes and wire electrode inclination instruction codes are inputted to an NC device. The NC device then determines whether or not, with respect to the wire electrode inclination instruction codes, a wire electrode inclination before a corner is different from that after the corner. If the inclinations are different, a plurality of movement instructions are calculated and inserted between the movement instructions forming the corner. The wire electrode is then moved at the corner in accordance with the plurality of movement instructions thus calculated.

5 Claims, 15 Drawing Figures

STEP A

```
READ:   (G01 x100, Y100)
        (G02 x200, I50)
        (A5)
        (Z1=0, Z2=20)
```

STEP B

G01x_Y_;
G01x_Y_;

STEP C

WIRE ELECTRODE TYPE ELECTRICAL DISCHARGE MACHINING METHOD

BACKGROUND OF THE INVENTION

The present invention relates to a wire electrode type electrical discharge machining method for machining a workpiece into a desired shape by electrical discharge with a wire electrode under the control of a NC (numerical control) device. More particularly, the invention relates to a method for controlling the taper angle while cutting a workpiece with a wire electrode.

FIGS. 1 through 7 describe a conventional wire electrode type electrical discharge machining apparatus of the same general type to which the invention pertains.

In FIG. 1, reference numeral 1 designates a wire electrode; 2, a pair of brake rollers; 3, a wire supplying reel; 4, an upper guide; 5, a machining solution supplying pump; 6, a machining solution tank; 7, an X-Y cross table movable both in the X-axis direction and in the Y-axis direction; 8, a workpiece; 9, an electric power source; 10, a lower feeding guide; 11, a pair of wire electrode winding rollers; 12, a winding reel; 13, an X-axis direction drive motor; 14, a Y-axis direction drive motor; 15, a U-axis direction drive motor; 16, a V-axis direction drive motor; 17, a U-V cross table movable both in the U-axis direction and in the V-axis direction; and 18, an NC device.

In the wire electrode type electrical discharge machining apparatus thus constructed, the power source 9 applies a high frequency pulse current between the wire electrode 1 and the workpiece 8 which the wire penetrates. When, with the wire electrode 1 surrounded by the machining solution supplied from the machining solution supplying pump 5, a pulsive arc discharge is repeatedly carried out between the wire electrode 1 and the workpiece 8, heat is generated by resistive heating and the impulse of electrons and pressure is produced by the generation of vapor to thus melt the workpiece 8 so that the latter is machined as required.

In an electrical discharge machining operation employing a three-dimensional machining configuration programmed by the NC device 3, the X-axis direction drive motor 13, the Y-axis direction drive motor 14, the U-axis direction drive motor 15 and the V-axis direction drive motor 16 are driven to move the X-Y cross table 7 and the U-V cross table 17 in predetermined directions, as a result of which the workpiece 8 mounted on the X-Y table 7 is machined into the programmed configuration. Of course, the X-Y cross table and the U-V cross table are moved in parallel with each other at all times.

The aforementioned NC device 18 is designed as shown in FIG. 2. In FIG. 2, reference numeral 52 designates an NC device body; 50, an operating panel including paper tape reader for reading an NC tape and a CRT display unit 50a; and 54, an output conversion unit. The NC device body 52 and the operating panel 50 form the NC device 18.

In the NC device, the paper tape reader reads the contents of an NC tape containing an NC operating program, and the contents thus read are applied through a signal line 51 to the NC device body 52 where they are stored in memory. In the NC device, the amounts of movement to be imparted to the cross tables are calculated and converted into binary codes. The binary codes are applied through a signal line 53 to the output conversion unit 54. The output conversion unit 54 converts the binary codes into pulse outputs, which are applied through signal lines 55 to the drive motors 13, 14, 15 and 16. As a result, the X-Y cross table 7 and the U-V cross table 17 are moved in predetermined directions. In other words, the output conversion unit 54 operates to convert the pulse outputs of the NC device body 52 into signals to operate the apparatus as required to carry out the designated machining operation.

On the other hand, the wire electrode 1 is supplied from the wire supplying reel 3 to the winding reel 12 which being maintained under a constant tension by the winding rollers 11 and the brake rollers 2.

FIG. 3 shows positional relationships between the workpiece 8 and the wire electrode 1. In FIG. 3, $\theta$ designates the angle between the wire and a normal to the X-Y cross table 7, and reference numerals 60 through 64 designate distances from the lower feeding guide 10. More specifically, reference numeral 60 designates the distance between the guide 10 and the X-Y cross table; 61, the distance between the guide 10 and the program execution level (which is the machining lower surface of the workpiece 8); 62, the distance between the guide 10 and the machining speed instruction level (which is the center of the machining thickness (t) of the workpiece 8); 63, the distance between the guide 10 and the upper specified level (which is the machining upper surface of the workpiece 8); and 64, the distance between the guide 10 and the upper guide 4.

Driving the electrical discharge machining apparatus shown in FIG. 1 with the NC device shown in FIG. 2, any especially the inclination of the wire electrode 1, will be described.

FIG. 4 is a flow chart for a description of the inputs and outputs of the NC device 8. First, the paper tape reader set by the operating panel 50 of the NC device is operated to read the data of the NC tape. The data thus read is as indicated in Step A of FIG. 4. That is, the data includes movement instruction codes such as a linear movement instruction code (G01X100,Y100) and an arcuate movement instruction code (G02X200,I50), a taper angle instruction code (A5) for specifying the inclination of the wire electrode 1, and guide height instruction codes (Z1=0 and Z2=20) for specifying taper factors.

The data thus read is utilized to calculate a taper offset locus as indicated in Step B of FIG. 4. The read-in data indicates the end points of movement of the electrode, and the start point is the end point which is determined by the preceding read-in data. In Step B of FIG. 4, double-line arrows designate a locus designated by read-in data, single-line arrows designate a taper offset locus, and broken-line arrows designate a taper offset value which is the product of the distance between the upper guide 4 and the lower feeding guide 10 and tan A, which is specified by the taper angle instruction code (A5). Thus, the electrode movement locus and the taper offset locus are obtained; that is, calculated values as shown in Step C of the FIG. 4 are outputted.

The taper factor instruction codes are as shown in FIG. 5. Specifically, the taper factors are defined as follows: the taper factor Z4 is the distance between the lower guide and the table's upper surface, the taper factor Z3 is the distance between the table's upper surface and the upper guide; the taper factor Z2 is the distance between the table's upper surface and the speed instruction level, the taper factor Z1 is the distance between the table's upper surface and the program instruction level (read-in data), and the taper factor Z5 is the distance between the table's upper surface and the work range instruction level.

Accordingly, the distances 60 through 64 in Fig. 3 are related to the taper factors Z1 through Z5 as follows:

$$60 = Z4$$

$$61 = Z4 + Z1$$

$$62 = Z4 + Z2$$

$$63 = Z4 + Z5$$

$$64 = Z4 + Z3$$

FIG. 6 is an explanatory diagram showing movement loci (program loci) in the distance 61 between the lower guide 10 and the program execution level, and taper offset loci in the distance 63 between the lower guide 10 and the upper specified level (which is the machining upper surface of the workpiece 8) in the program of the NC device 18. In FIG. 6, reference numerals 20 and 25 designate the movement loci (program loci) in the distance 61 to the program execution level, and reference numerals 21 and 26 designate the taper offset loci in the distance 63 to the upper specified level. In the case of FIG. 6, the taper offset locus 21 and the program locus 20 start an interpolation movement at the same time and end it at the same time, and similarly the taper offset locus 26 and the program locus 25 start an interpolation movement at the same time and end it at the same time in machining the workpiece. In FIG. 6, reference numeral 22 designates a taper offset value; 23, the intersection of the program loci 20 and 25; and 24, the intersection of the taper offset loci 21 and 26. In this case, the taper offset loci 21 and 26 are obtained as the composite of the movement of the X-Y cross table 7 and the movement of the upper guide 4 in FIG. 1. Accordingly, the control instructions applied to the upper guide 4 by the NC device are such that the movements of the taper offset loci 21 and 26 are reduced by those of the program loci 20 and 25, respectively.

As the apparatus operates in response to the control instructions as described above, when the program loci 20 and 25 intersect at an acute angle as shown in FIG. 7, the taper offset loci 21 and 26 are as indicated in FIG. 7; that is, the distance between the intersections 23 and 24 is increased when compared with that in FIG. 6. In this case, the wire electrode 1 must be inclined at a large angle. Since the mechanical strength of the wire electrode is limited, sometimes it becomes impossible to perform such an electrical discharge machining operation.

In order to overcome this difficulty, heretofore, the following method has been employed: As shown in FIG. 8 or 9, an arcuate block 30 having a radius equal to the taper offset value and connecting the end point 28 of the taper offset locus 21 before the corner (intersection) to the start point 29 of the taper offset locus 26 is inserted between the blocks before and after the corner. An interpolation calculation is performed, including both linear interpolation and curvilinear interpolation, to move the wire electrode. However, this method is disadvantageous in that, in the case where the taper offset value before the corner is different from that after the corner, it is considerably difficult to insert the arcuate block 30.

This will be described in more detail. In the case where the taper offset value before the corner is equal to that after the corner, the center of the arcuate block 30 can be the intersection of the program loci 20 and 25. On the other hand, in the case where the taper offset value before the corner is different from that after the corner, further calculations must be employed to obtain the radius of the arcuate block 30 thereby to determine its center, or when the center of the arcuate block 30 is set at the intersection of the program loci 20 and 25, the interpolation for the arcuate block 30 must be helical, which is difficult to carry out.

SUMMARY OF THE INVENTION

Accordingly, an object of the invention is to provide a wire electrode type electrical discharge machining method in which, even when a taper offset value before the intersection of program loci is different from that after the intersection, the program can be readily executed.

Another object of the invention is to provide a wire electrode type electrical discharge machining method in which a conventional interpolation system including linear interpolation and curvilinear interpolation can be used without modification so that an electrical discharge machining operation can be readily programmed and executed.

The foregoing objects and other objects of the invention have been achieved by the provision of a wire electrode type electrical discharge machining method in which a wire electrode is controlled by an NC device to automatically move along predetermined movement loci as specified while forming an angle with a workpiece, in which, according to the invention, when a wire electrode inclination effected before the corner of the loci is different from that effected after the corner, a plurality of movement instructions are automatically inserted between the movement instructions forming the corner to control the movement of the wire electrode.

The nature, principle and utility of the invention will become more apparent from the following detailed description when read in conjunction with the accompanying drawings.

DESCRIPTION OF THE PREFERRED EMBODIMENTS

Figure 1:
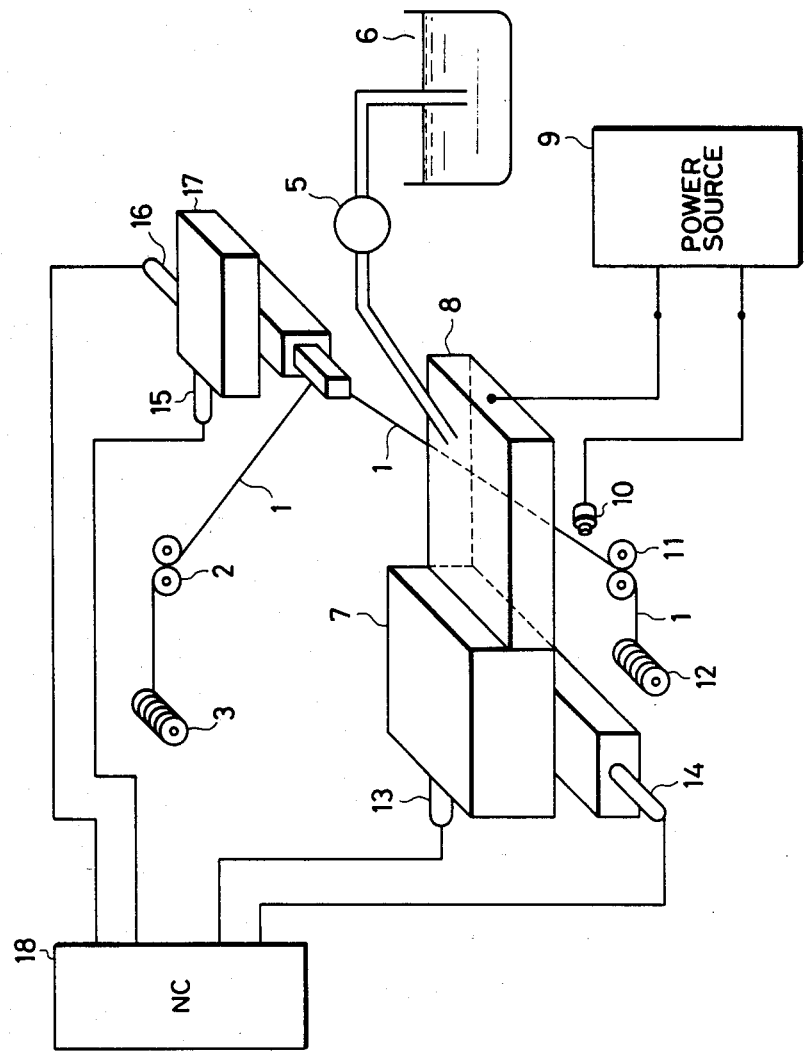
FIG. 1 is an explanatory diagram showing the overall arrangement of a conventional wire electrode type electrical discharge machining apparatus.
Figure 2:
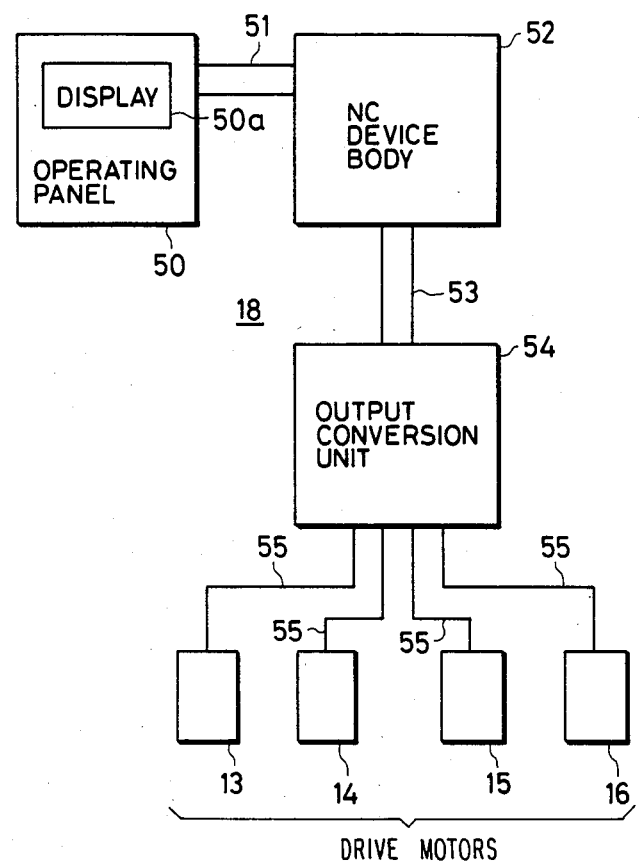
FIG. 2 is a block diagram showing the arrangement of an NC device employed in the apparatus of FIG. 1.
Figure 3:
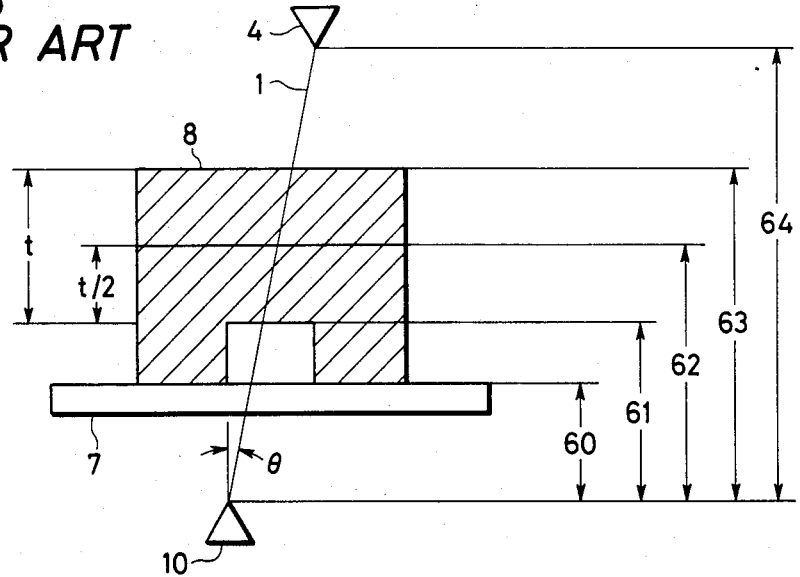
FIG. 3 is an explanatory diagram showing positional relationships between a wire electrode and a workpiece.
Figure 4:
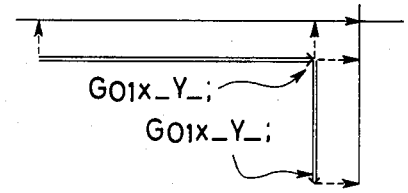
FIG. 4 is a flow chart indicating inputs and outputs to and from the NC device.
Figure 4:
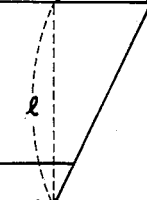
Figure 5:
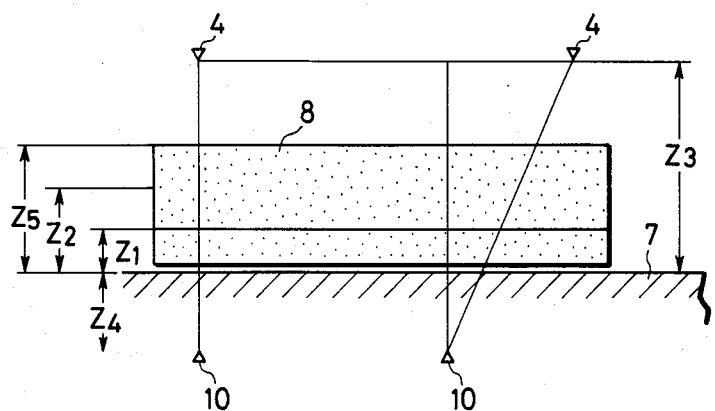
FIG. 5 is an explanatory diagram for a description of taper factors inputted to the NC device.
Figure 6:
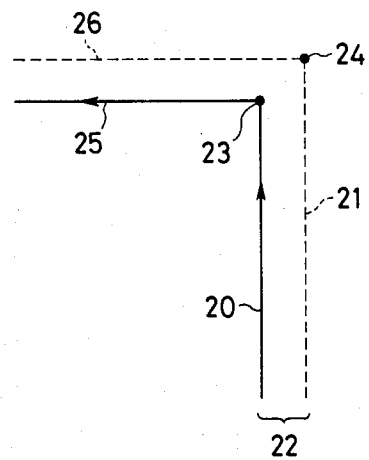
FIG. 6 is an explanatory diagram for a description of the program loci and taper offset loci of a wire electrode.
Figure 7:
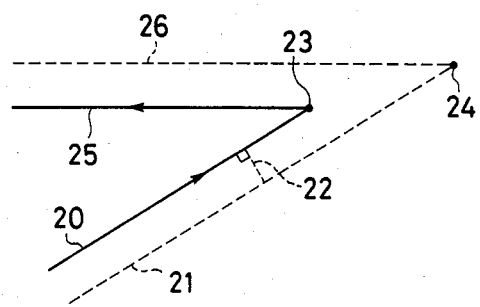
FIG. 7 is an explanatory diagram for a description of the drawbacks of conventional taper offset loci at a corner.
Figure 8:
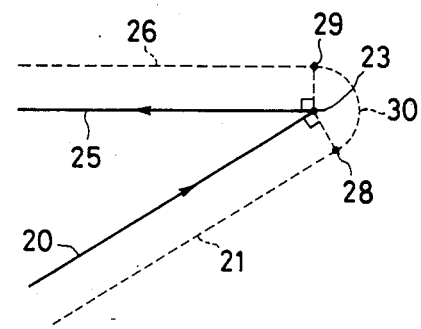
FIGS. 8 and 9 are explanatory diagrams for a description of a conventional method of inserting arcuate blocks at a corner.
Figure 9:
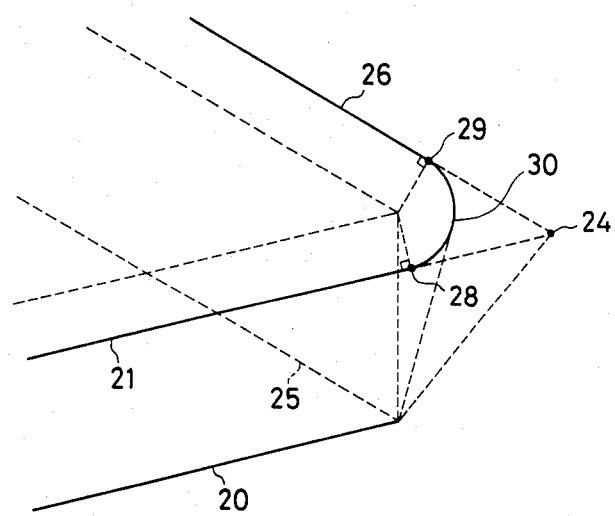
Figure 10:
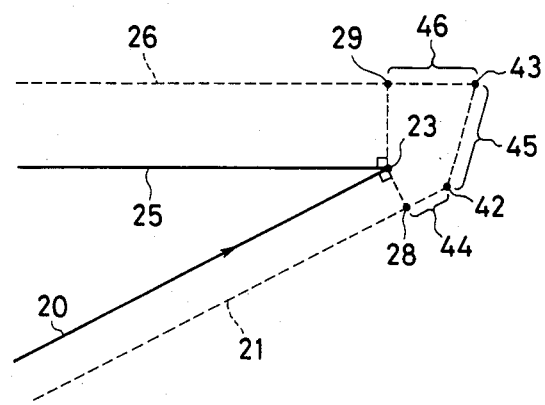
FIGS. 10 and 11 are explanatory diagrams showing program loci and taper offset loci according to a first embodiment of the invention.
Figure 11:
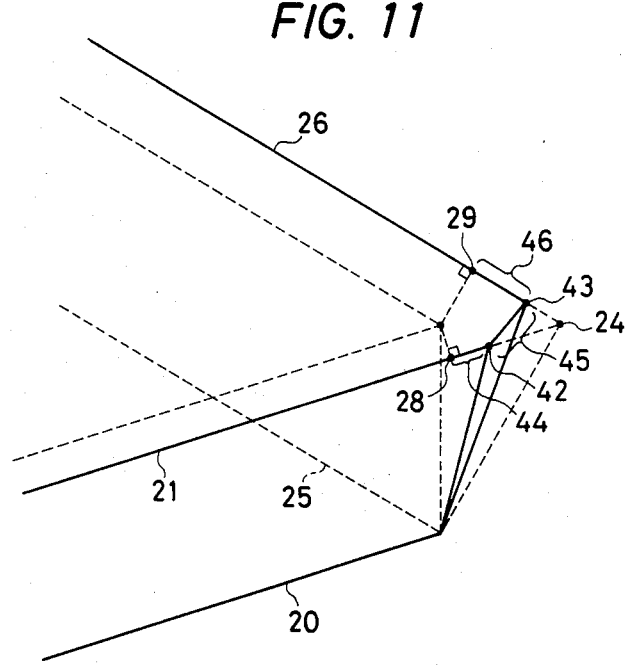

FIGS. 10 and 11 illustrate a first embodiment of the invention.

In these figures, reference numeral 20 designates a program locus; 21, an actual taper offset locus according to the invention; and 44, 45 and 46, three linear blocks which, instead of the conventional arcuate block 30 (described above), are inserted between the blocks before and after the corner. The linear blocks 44, 45 and 46 are set as follows:

First, a point is obtained on an extension of the taper offset locus 21 at a distance from the end point 28 of the latter which is equal to the taper offset value. The point thus obtained is referred to as a first relay point 42. Then, a point is obtained on an extension of a taper offset locus 26 after the corner which extends in a direction opposite to the locus advancing direction at a distance from the start point of the locus 26 equal to the taper offset value of the locus 26. The point thus obtained will be referred to as a second relay point 43.

Thus, the linear block 44 connecting the end point 28 of the taper offset locus 21 before the corner and the first relay point 42, the linear block 45 connecting the first relay point 42 and the second relay point 43, and the linear block 46 connecting the second relay point 43 and the start point 29 of the taper offset locus 26 after the corner can be obtained.

In the above-described embodiment, the corner is formed by linear blocks. However, it does without saying that the same effect can be obtained by forming the corner with a combination of linear and arcuate blocks or with arcuate blocks only. That is, the relay point can be obtained on the line tangent to the arcuate block.

Figure 12:
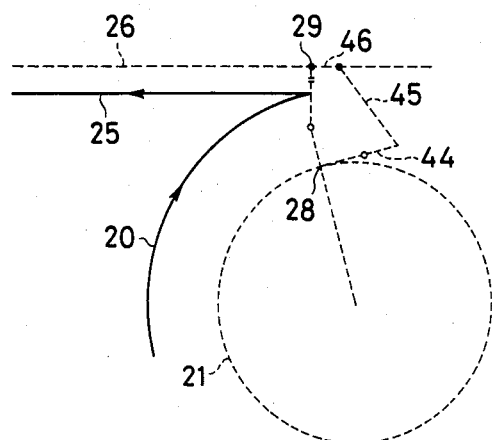
FIGS. 12 and 13 are explanatory diagrams showing program loci and taper offset loci according to a second embodiment of the invention.
Figure 13:
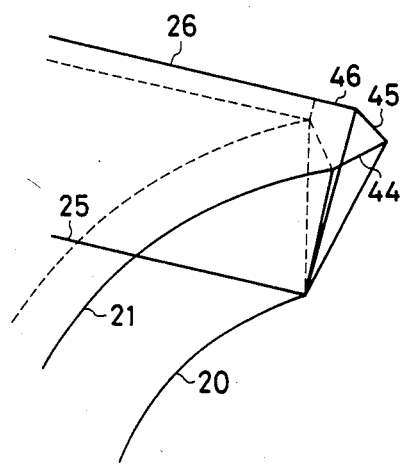

Formation of the corner with arcuate and linear blocks will be described. FIG. 12 is a diagram corresponding to FIG. 10, and FIG. 13 is a diagram corresponding to FIG. 11. In these figures, a program locus 20 indicates an arcuate block. First, a point is obtained on the line tangent to the taper offset locus 21 of the arcuate block at the end point 28 of the taper offset locus 21 so that the distance between the point and the end point 28 is equal to the taper offset value, i.e., a linear block 44, is determined. Then, similar to the embodiment described with reference to FIGS. 10 and 11, linear blocks 45 and 46 are determined.

Figure 14:
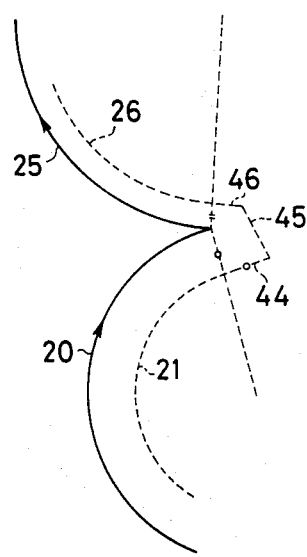
FIGS. 14 and 15 are explanatory diagrams showing program loci and taper offset loci according to a third embodiment of the invention.
Figure 15:
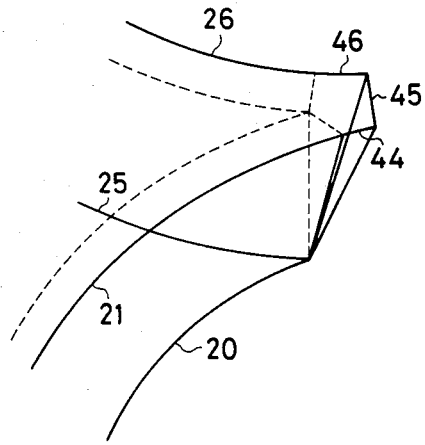

Formation of the corner with arcuate blocks will be described. FIG. 14 is a diagram corresponding to FIG. 10, and FIG. 15 is a diagram corresponding to FIG. 11. In these figures, program loci 20 and 25 are for arcuate blocks. As in the case of the program locus indicating the arcuate block in FIG. 12 or 13, three linear blocks 44, 45 and 46 can be obtained.

As described above, the intersection of two program loci is obtained and the necessary taper offset values are calculated to effect movement instructions.

As is apparent from the above description, three linear blocks are inserted between the blocks before and after the corner. Therefore, in the method of the invention, unlike the conventional method, the program can be executed without changing the interpolation logical operations or intersection calculations.

The conventional (linear and arcuate) interpolation logical operations can be used without modification. In the case where the intersection can be obtained by intersection calculation, the conventional logical operations can be employed. When the intersection cannot be obtained (or when the taper distance is long), a logical operation is employed in which an extension is made equal to the taper offset value to inset the corner. In this logical operation, three linear blocks are inserted. Accordingly, in the case of an arc, there is no limitation that the start radius must be equal to the end radius, and therefore the taper angle can be freely changed.

We claim:

1. A wire electrode type electrical discharge machining method in which a wire electrode is controlled by an NC device to automatically move along predetermined loci while forming an angle with a workpiece, which method comprises the steps of:

inputting wire electrode movement instruction codes and wire electrode inclination instruction codes into said NC device;

determining whether or not, with respect to said wire electrode inclination codes, a wire electrode inclination before a corner is different from a wire electrode inclination after said corner;

calculating, when said wire electrode inclinations are different, a plurality of movement instructions to be inserted between movement instructions forming said corner, by calculating movement instructions including a plurality of linear blocks to be inserted between an end point of a taper offset locus according to a wire electrode inclination immediately before said corner and a start point of a taper offset locus according to a wire electrode inclination immediately after said corner;

said taper offset locus located immediately before said corner being extended from the end point thereof by a taper offset value thereof to obtain a first linear block with a first extended end, and said taper offset locus located immediately after said corner being extended from the start point thereof by a taper offset value thereof to obtain a second linear block with a second extended end, and said first extended end being connected to said second extended end to form a third linear block; and moving said wire electrode at said corner according to said plurality of movement instructions thus calculated.

2. The method as claimed in claim 1, in which said movement instructions before and after said corner are linear movement instructions.

3. The method as claimed in claim 1, in which said movement instructions effected before and after said corner include both linear and arcuate movement instructions.

4. The method as claimed in claim 3, in which a taper offset locus according to said linear movement instruction is extended from one end thereof by a taper offset value thereof to obtain a first linear block with a first extended end, a taper offset locus according to said arcuate movement instruction is extended from one end thereof by a taper offset value thereof to obtain a second linear block with a second extended end, and said first extended end is connected to second extended end to obtain a third linear block.

5. The method as claimed in claim 1, in which said movement instructions effected before and after said corner are arcuate movement instructions.

* * * * *